United States Patent
Hallberg et al.

[19]

[11] Patent Number: 6,122,976
[45] Date of Patent: Sep. 26, 2000

[54] PRESSURE SENSOR WITH HOUSING, SENSOR ELEMENT HAVING CERAMIC COMPONENTS, AND SUPPORT RING MOUNTING SENSOR ELEMENT TO HOUSING

[75] Inventors: Nils Gunno Hallberg, Atvidaberg; Staffan Jonsson, Sollentuna, both of Sweden

[73] Assignee: Cecap Ab, Karlskoga, Sweden

[21] Appl. No.: 08/666,593

[22] PCT Filed: Apr. 18, 1995

[86] PCT No.: PCT/SE95/00426

§ 371 Date: Apr. 8, 1997

§ 102(e) Date: Apr. 8, 1997

[87] PCT Pub. No.: WO95/28623

PCT Pub. Date: Oct. 26, 1995

[30] Foreign Application Priority Data

Apr. 14, 1994 [SE] Sweden .................................. 9401269

[51] Int. Cl.[7] .......................................................... G01L 7/00
[52] U.S. Cl. .................................................................. 73/756
[58] Field of Search ............................. 73/273, 431, 756, 73/708, 718, 724; 361/283.1

[56] References Cited

U.S. PATENT DOCUMENTS

| | | | |
|---|---|---|---|
| 3,619,742 | 11/1971 | Rud, Jr. ......................................... | 73/756 |
| 4,389,895 | 6/1983 | Rud, Jr. ......................................... | 73/724 |
| 4,774,626 | 9/1988 | Charboneau et al. ..................... | 361/283.1 |
| 4,875,368 | 10/1989 | Delattore ..................................... | 73/708 |
| 4,898,035 | 2/1990 | Yajima et al. ............................... | 73/727 |
| 5,134,887 | 8/1992 | Bell ............................................... | 73/718 |
| 5,186,055 | 2/1993 | Kovacich et al. .......................... | 73/727 |
| 5,271,277 | 12/1993 | Pandorf ........................................ | 73/724 |

FOREIGN PATENT DOCUMENTS

| | | | |
|---|---|---|---|
| 0 549 229 A2 | 6/1993 | European Pat. Off. .......... | G01L 9/12 |
| 2 162 837 | 2/1986 | United Kingdom ............ | C03C 27/04 |

*Primary Examiner*—William Oen
*Attorney, Agent, or Firm*—Limbach & Limbach L.L.P.

[57] ABSTRACT

A capacitive pressure sensor for measurement of the pressure of a fluid comprises a sensor element (1) which is made of a ceramic, in particular glass ceramic, material and in the conventional way has interior capacitor plates. The sensor element (1) is plate-shaped and joined to a surrounding support ring (5"). The support ring (5") is made of metal and is connected to the sensor elemnt (1) by means of a joint (3') made of ceramics, in particular glass ceramics, at an annular region around an edge line of the sensor element (1). The support ring (5") can have a shoulder formed by a protrusion (15) in the interior surface thereof, against which shoulder then a region of the sensor element (1) rests and at which the joint (3') is made.

15 Claims, 5 Drawing Sheets

PRESSURE SENSOR WITH HOUSING, SENSOR ELEMENT HAVING CERAMIC COMPONENTS, AND SUPPORT RING MOUNTING SENSOR ELEMENT TO HOUSING

TECHNICAL FIELD

The present invention relates to pressure transducers or sensors for measurement of pressures from fluids of various kinds, both gases and liquids, and also to methods of producing pressure transducers or sensors and in particular mounting or attaching a sensor element in a transducer/sensor.

BACKGROUND OF THE INVENTION AND STANDPOINT OF THE ART

In developing the sensor element for a pressure sensor a very large number of technical parameters exist which must be considered. These parameters are of a thermal, electrical, mechanical or chemical nature. Each such group contains itself a multitude of technical parameters and further various properties interact between the groups as applied to a sensor element. Chemical characteristics influence surface coatings, which influence thermal and mechanical properties. The density and impermeability influence possible structural thicknesses what influences the mechanical characteristics, etc. A search ol the characteristics of various conceivable materials concludes usually that the following materials can possibly be used: metals of special types such as the alloys "Inconel" and "Hastalloy", semi-conductor materials, for example silicon, ceramic materials, for example aluminum oxide.

A very large work has been made in developing different types of sensor elements. In order to use the sensor element it must, however, be mounted in a housing, casing or similar device, to obtain a complete or finished pressure sensor, which is ready to be used after a simple connection to some volume, where a medium is present. However, the mounting or attachment method for forming a complete pressure sensor can often result in the fact that the high precision of the very sensor element is lost. It depends on the fact that, again, in the mounting process problems in regard of the materials used appear which are for example of the following kind. For metals, their high coefficients of thermal expansion result in thermal stresses, they are not impermeable to some gases, they are deformable. Semiconductor materials are sensitive to temperature and are easily attacked chemically, what can have the consequence that a system comprising oil capillaries must be used to conduct the pressure that is to be measured to a pressure sensitive surface. The attachment or securing of parts of ceramic materials is often performed, due to the difficulty of working these materials and their production at very high temperatures, must often by means of O-rings, which do not possess a sufficient chemical resistance or inertness.

The housing of the pressure sensor is nearly always made of metal and thus, to this metal the very sensor element must be attached or clamped. A suitable ceramic material for use in the construction of sensor elements is glass ceramics, since components or parts of this material can be produced and joined/bonded at temperatures which are rather low in this context. If the sensor element thus is to be bonded directly to metal, it is a critical problem to adapt the coefficient of thermal expansion of the metal to which the sensor element is to be mounted or clamped, further of the material in the very sensor element and also of the bonding or joining material used.

Sensor elements for pressure sensors based on ceramic materials and constructed as dilatation sensors or capacitive sensors can comprise various ceramic materials. Then, often ceramics based on aluminum oxide is used but also glass ceramics is used. In the production of sensor elements based on aluminum oxide the various surface coating processes and the procedures for burning/fusioning the various elements included in a sensor element to each other must be performed at a significantly higher temperature than for glass ceramics. To design, for sensor elements based on aluminum oxide, a sequential order for all these processes comprising surface coating procedures of various kinds and burning/fusion processes, which does not destroy the result of earlier coating processes and other processes in the sequence of procedural steps in the production, must be considered very difficult. Further, to adapt for such sensor elements physical parameters, for example coefficients of thermal linear expansion, over a wide temperature range is also very difficult. Therefrom it is obtained as a natural consequence that the high temperatures used imply that mechanical stresses will exist in a finished sensor element, what has naturally various resulting, difficult effects when using the sensor element in a pressure sensor. A rigid securing or attachment of a sensor element constructed of ceramic materials to a metal part, for example a ring of stainless steel, can thus in most cases not be performed owing to the built-in mechanical stresses obtained from the thermotechnical conditions during the production process of the sensor element.

A prior alternative is to clamp a sensor element, which as conventional has the shape of e.g. a flat round plate or chip, to an O-ring, so that it is pressed against one of the flat surfaces of the sensor element at a region adjacent to the edge of this surface. The clamping force can be produced by a threaded ring acting on the opposite side of the sensor element and at a region adjacent the edge of this surface. Another previously known alternative is that a force from a fluid, the pressure of which is to be measured, is transferred from a primary measuring diaphragm through an auxiliary fluid to a surface of the sensor element. The clamping of the sensor element can in the latter case be accomplished in a simpler way, owing to the fact that the characteristics of the auxiliary fluid, e.g. silicon oil, which is used for transferring the pressure to be measured, are known. Such methods can however only achieve limited performance due to mechanical elasticity and mechanical instabilities in an O-ring or a silicon oil, respectively, so that a large accuracy and a rapid sensor response cannot most often be obtained.

A rigid securing/mounting of the sensor element is according to the discussion above necessary in order to achieve precision sensors for measurements in for instance industrial areas, where low pressures are used, such as the semi-conductor industry, but also for pressure sensors intended for measurement of ordinary pressures a rigid attachment/mounting of the sensor element produces distinctly superior characteristics.

In a prior sensor, see the U.S. Pat. No. 5,249,469, which can be made having different dimensions for measuring pressures of different magnitudes, both vacuum pressures and atmospherical pressures, the sensor element is almost completely arranged within a volume filled with a fluid the pressure of which is to be measured. The sensor element is attached to a sensor house by means of two slender tubes having a very small cross-sectional area of the material of the tubes. In the use of the pressure sensor for measurement of low pressures, for measurement of a vacuum, the whole measurement element is thermotechnically isolated from the surroundings and is influenced little by changes in the ambient temperature. The heat transport to and from the sensor by means of convection and radiation is small and the heat transport occurs substantially as conduction of heat through the slender tubes.

At rapid temperature changes, in e.g. the use at a low pressure, in a rapid pumping down to a vacuum, in a rapid inlet of fluid, the gas, e.g. air, the pressure of which is to be measured, will expand or contract. It results in a small cooling or heating respectively of the gas within the measurement volume, with which the sensor element is in contact, and thence also of the sensor element itself.

This phenomenon is in particular embarrassing for a rapid pumping to a low pressure, since the sensor element then, comprising a mount according to the discussion above comprising slender tubes, is thermotechnically well isolated both from the housing to which it is attached and which in many cases rather rapidly will adopt the new temperature due to the fact that it comprises large surfaces and is made of metal, and from the gas itself. The temperature equalization between the sensor element and the surroundings occurs in this case very slowly through the slender tubes and the zero position of the sensor is then displaced or offset during a rather long time. The return process to the state existing before such a change can in the worst cases comprise a time of up to the magnitude of order of hours, which naturally cannot be accepted. In FIGS. 1a–1c time diagrams are illustrated showing the zero position of the output signal for different heat conduction cases in relation to the surroundings. In the normal case or in the case comprising a good heat conduction according to FIG. 1a the zero level thus returns to its normal value after a limited time period. In other cases for which a good thermotechnical isolation is provided between the sensor element and the material in the surroundings, the zero level dependence of time can look as is illustrated by the curves of FIGS. 1b and 1c, comprising the long period mentioned above for a return to the zero level, in FIG. 1b comprising a positive zero point offset and in FIG. 1c a negative zero point offset during a rather long time. The different curve shapes in FIGS. 1b and 1c depend primarily on the processes used in the production of the sensor element itself, i.e. the interior characteristics thereof. It is possible, in principle, to compensate for the rapid changes of the zero level in an electronic way but practically it is combined with large difficulties, since the sensor element itself is in this construction not easily available for arranging temperature sensors such as thermistors.

A sensor element suspended in two slender tubes is generally not easily produced. However, it can be used where a high cost of the pressure sensor can be accepted and for small volumes, for instance in the production of semiconductor elements. For other industrial sensors where large numbers of sensors are required but not as extreme performance, this type of attachment is impossible. Industrial sensors should also preferably be able to be operated for measurement of pressures in different media, both gases and liquids. For liquids the mounting by means of two slender tubes does not work.

Another complication in an attachment by means of slender tubes is the welding thereof to the housing for the sensor element surrounding it. During this welding step, through the slender tubes, mechanical stresses in the very sensor element that is constructed substantially of ceramic material can be very easily introduced, due to the heat generated by the welding flame used in the welding procedure. The mechanical stresses generated in this welding process to the lid or the housing of the sensor element depend on a lot of factors, the diameters of the tubes, the welding velocity, the cooling method, the degree in which it is possible to simultaneously make the two welds, etc. The final result is that each sensor mounted in a housing will obtain individual characteristics which differ rather much from each other. Thereby the problem of the accuracy of the sensor is transferred to a final calibration of the sensor itself, where these various imperfections must be acted on or treated individually and be compensated in different complicated ways.

An alternative to an attachment by means of two slender tubes is by means of one single centrally mounted tube, to which a housing portion or annular portion associated with or connected to the sensor element of a ceramic material is welded.

For an attachment by means of two slender tubes the whole sensor element is exposed to the pressure to be measured what is an advantage in particular when measuring pressures above the atmospherical pressure or above the ambient pressure. All the ceramic parts are then loaded or stressed by the same compression forces what the incorporated ceramic materials can stand very well. This advantage for measurements above the atmospherical pressure is not as pronounced for measurements of lower pressures or for measurements of a vacuum.

For an attachment comprising a single, centrally welded tube, through which the fluid enters the pressure of which is to be measured and which acts on only one surface of a sensor element, worse characteristics are obtained in the corresponding way for measurements of pressures above the ambient pressure. Since only one surface of the pressure element is loaded, the element can be "blown up" approximately in the same way as a balloon. This effect does naturally not exist for pressure sensors intended for measurements of low pressures and in that case this attachment method works satisfactorily. Such an attachment by means of a central tube welded to a housing portion in the shape of a circular plate of metal having on one side an annular projection or bead at the circumference and having a central aperture, can at present stand an overpressure of about 10–15 bar. Above this pressure a risk of bursting exists which will be manifest around or at the joints between the ceramics parts of which the sensor element is constructed, or by the fact that alternatively the diaphragm in the sensor element breaks. The security factor against rupture will thereby be low. Owing to the required processing steps at high temperatures further a distribution of pressures is obtained for which a rupture occurs, what in addition results in an unacceptable insecurity in this constructional method.

From the European Patent Application EP-A2 0 549 229 a pressure transducer is previously known comprising a sensor element having a ceramics house 38 and a diaphragm 36 arranged thereon which is made of metal (Inconel). Between an exterior stable support ring 42 an intermediate ring 86 is provided, which is welded at its one edge surface to the stable support ring 42. The other edge surface is connected at a shoulder or step and by means of glass joint to the ceramics house 38, at an angular projection thereon. The intermediate ring 86 is made of metal ("Inconel") having a coefficient of thermal expansion adapted to the material in the housing 38 and has a narrow web between the surfaces where the ring 86 is attached to the exterior support ring 42 and to the ceramic; housing 38. This construction reduces the transfer of the mechanical stresses which can arise at temperature changes due to different thermal expansion coefficients of the support ring 42 and the intermediate ring 86. In order to further reduce the influence of these stresses the intermediate ring is slotted, see item 98 of FIG. 4. However, such a construction will make the mounting of the sensor element less definite, as considered totally, and reduces the precision of the finished pressure sensor. The attachment to an annular projection on the sensor element reduces the thermal transfer and the projection can also break rather easily. Further, the fluid the pressure of which is to be measured and which is present at the exterior surface of the diaphragm 36, will also act on the whole sensor element, i.e. also on the rear side of the ceramics housing 38, what can be a disadvantage in certain cases, such as for measurement of pressures of liquids, in the case where a cleaning of the measurement volume may be required.

DESCRIPTION OF THE INVENTION

It is an object of the invention to provide a pressure sensor having a rigid mounting of a ceramic sensor element which can be achieved without incurring any substantial risk that the sensor element will break.

It is a further object of the invention to provide a pressure sensor having a fixed or rigid securing or attachment of the sensor element allowing measurements of pressures both in gases and liquids.

It is another object of the invention to provide a pressure sensor comprising an attachment of the sensor element which satisfies hygienic requirements cr generally the requirement that it will be possible to get rid of rests of earlier measurement media in and at the portion of the sensor which is exposed to a medium the pressure of which is to be measured.

It is a further object of the invention to provide a pressure sensor for which no essential inherent or incorporated mechanical stresses are introduced in a sensor element when attaching or mounting the sensor element.

It is another object of the invention to provide a pressure sensor comprising a mounting of a sensor element, the mounting including no chemically unstable materials.

It is a further object of the invention to provide a pressure sensor having a high repeatability for measurements.

It is a further object of the invention to provide a pressure sensor having a good long time stability and presenting small changes of its characteristics at temperature changes.

It is a further object of the invention to provide a pressure sensor which is available for mounting auxiliary sensors, such as temperature sensors, on a pressure sensor element.

It is another object of the invention to provide methods for production of pressure sensors which have a high precision or accuracy.

It is a further object of the invention to provide methods of mounting sensor elements in pressure sensors in order to produce pressure sensors having a high accuracy and in particular of connecting a ceramic material to another material by means of an impermeable joint.

The objects mentioned above are achieved by the invention the detailed characteristics of which appear from the appended claims.

A sensor element built of parts based on glass ceramics is by means cf a joint of a glass material attached to an intermediate part of stainless steel and hereby a rigid attachment of the sensor element is obtained. The intermediate part of stainless steel is then in turn welded in a sensor housing or casing, possibly through another stainless part.

For this basic construction there will in the pressure sensor be no chemically unstable materials which are in contact with fluid within a measurement volume in which the pressure is to be measured. It is in particular important in the use for low pressures, for a vacuum. However, it is considerably more important, as has been indicated above, that a rigid attachment of the sensor element distinctly improves a number of technical characteristics, e.g. repeatability generally for an electrically detected output quantity, repeatability within the measurement range and also, which is very important, a repeatability for overpressure loads. Hereby hysteresis in the pressure sensor can be eliminated to such a high extent that it cannot be demonstrated or proved. The long time stability is enhanced and changes owing to temperature changes are reduced, compare e.g. a sensor element clamped by means of an O-ring, the material properties of which at different temperatures strongly influence the result of the measurement for such a clamped sensor.

The material in the stainless part to which the very sensor element is welded, is selected to have adapted properties, in particular in regard of thermal expansion at various temperatures, so that steel having a very particular composition must often be used. Further, this metal part must be heat-treated in a particular way in order that the attachment between the sensor element of ceramics to the material of the metal part will work without producing, neither at the production or in the use of the pressure sensor, ruptures or breaks in the sensor element.

The sensor element itself is constructed of ceramic plates or chips, processed in different ways, which are joined or bonded to each other by means of joints of a glass material. At the exterior circumference of the sensor element, in particular at only part of the exterior edge, a glass joint is obtained between the ceramic material of the sensor element and a surrounding exterior stainless steel ring. The stainless steel ring is designed to have a shoulder or step, which rests against the exterior marginal portion of one of the large surfaces of the essentially plate-shaped sensor element. The sensor element itself is also, in a preferred way, designed to have a rather small diameter, practically such a so small diameter as is allowed by the actual conditions, for instance of the magnitude of order of 10–20 mm and preferably within the range of 10–15 mm. In particular cases, where only the very diaphragm of the sensor element is allowed to be exposed to the fluid the pressure of which is to be measured, such as for liquids within the food manufacturing industry, the glass joint must extend over all of the cylindrical exterior edge of the sensor element so that no slot or recess is formed between the exterior circumferential edge of the sensor element and the interior envelope surface of the support ring. In this case the glass joint will have a rather long extension in the cross direction of the sensor element and therefore the paste or compound, which contains finely divided glass particles and which is coated in producing the glass joint, before the heating for melting or fusioning the glass particles, can be coated in a suitable dotted or channelled pattern having regular inner portions where no glass joint paste is deposited. Thereby those various gases which are generated in the heating for obtaining the very joint, are allowed to be let out from the joint during the heating process, and still a completely tight joint is obtained. A narrow slot at the circumference of the sensor element can also possibly be avoided by a suitable design of the inner portion of the stainless ring, for instance in such a way that it will be more narrow or tapering in the direction towards its center axis.

For sensors intended for low pressures comprising thin measurement diaphragms it can be advantageous if on this diaphragm side an extra part is arranged such as a counterplate or counterring. A portion, projecting axially and located at the edge of the counterplate or a flat annular surface of the counterring, respectively, is joined or bonded to the thin diaphragm by means of a glass joint. A counterplate is in that case provided with through holes in order that the pressure from the medium the pressure of which is to be measured will reach the very measurement diaphragm, which resides below the counterplate. Such an arrangement comprising a counterpart results in the effect that the measurement diaphragm will be more uniformly attached at its portion located at the circumference. The counterplate or counterring will thus stabilize the thin diaphragm.

The glass joint between the thin movable diaphragm and the house part of the sensor element, which is a generally considerably thicker ceramic plate, is very thin and thus forms the part, which is the part distinguishing the movable diaphragm and the sensor housing part from being a homogeneous mechanical body. Temperature gradients over the joint causes mechanical stresses which result in a displacement of the movable diaphragm and thereby an incorrectness of the output signal which is detected at the displacement of the diaphragm when influenced by the pressure from the measurement medium. It is particularly observable for thin diaphragms for measuring low pressures. Temperature gradients are obtained during the various heating steps in the manufacture and in the use of a pressure sensor also from the surroundings or from the medium the pressure of which is to be measured. These two cases can be treated in different ways.

The velocity with which a temperature change of the sensor element is obtained, has a large importance to the temperature drift of the sensor element. In the best case a temperature change occurs slowly so that correspondingly also a slow change of the zero level of the output signal occurs. This type of incorrectness in the output signal can be handled. The glass ceramic material which is preferred for the ceramic parts of the sensor element, has in addition the very positive property that it provides a linear relation between temperature change and error signal. Such an effect can be simply compensated electronically.

This case comprising slow temperature changes is illustrated by the diagram of FIG. 2a, where the output signal for a constant pressure of the measurement medium is plotted as function of time. For a rapid temperature change an output signal response is obtained of the type illustrated by the curves of FIGS. 2b and 2c. The final level after the temperature changes according to FIGS. 2b and 2c is the same as for the case illustrated by the curve of FIG. 2a and it can be electronically compensated. However, the intermediate region having a more or less high value of the derivative of the curve cannot be compensated in this way.

Rapid temperature gradients can be influenced by "buffering" the sensor element, i.e. hiding it from temperature changes in the surroundings. It can be accomplished in a number of different ways, for instance by means of an extremely heavy heat isolation, for instance corresponding to a filling of mineral wool having a thickness of 2 m, but such measures must always be balanced against technical aspects of manufacture and the benefit which it can imply to the user. If the sensor element is buffered thermotechnically in this way against the surroundings, also for rapid temperature changes a signal response is obtained of the type illustrated in FIG. 2a, which can be electronically compensated so that the resulting output signal will have a smooth or even behaviour.

If a deviation of the output signal for a temperature change cannot be compensated, it should in the best case have a shape according to the curve illustrated in the diagram of FIG. 2b, comprising a short spike-like pulse at the very temperature change.

Temperature changes in the medium the pressure of which is to be measured should preferably take place between different constant levels. For gaseous media normally no large problems are obtained owing to the small heat capacity of gases. Temperature changes in the medium should preferably, by a suitable design of the sensor element, influence it rapidly and the temperature should be evened out or equalized in the sensor element as quickly as possible. The preferred cases for the temperature changes are, as has already been indicated, the curves illustrated in FIGS. 2a and 2d.

A sensor element of this kind having such an attachment by means of a glass joint to a surrounding metal ring has the following advantages:

It is possible to use the sensor element for both gases and liquids. The sensor element can be used as an absolute pressure sensor and as a differential sensor, e.g. in relation to the atmospherical pressure.

The sensor element is rigidly attached by means of a glass joint and a weld in a sensor housing of stainless steel.

In a preferred case the diaphragm is rigidly attached or secured from two directions comprising a counterpart such as a plate or a ring.

The sensor element is available from the outside for electronic compensation and temperature sensors such as thermistors which can be arranged on the element.

The element can accommodate, in the shape of compression stresses, the forces from the measurement, i.e. the pressure from the medium the pressure of which is to be measured results only in mechanical compression stresses in the sensor element.

Only a "naked" diaphragm is exposed to the measurement medium.

The construction comprising an exterior attachment ring to which the very sensor element is joined or attached, stabilizes the ceramic sensor element itself.

Temperature gradients owing to temperature changes in the surroundings are minimized.

An adaption occurs rapidly to the temperature in the medium the pressure of which is to be measured.

BRIEF DESCRIPTION OF THE DRAWINGS

The invention will now be described in more detail and with reference to non-limiting embodiments and with reference to the accompanying drawings in which.

DETAILED DESCRIPTION

Figure 1A:
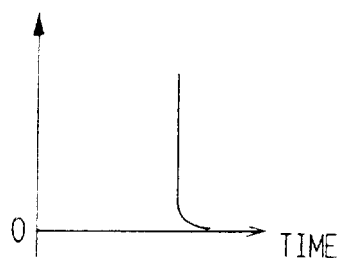
FIGS. 1a, 1b and 1c illustrate the displacement of the zero level of the output signal as a function of time for a sensor which is unloaded and well heat-isolated from the surroundings, when a temperature change takes place in the medium the pressure of which is measured.
Figure 1B:
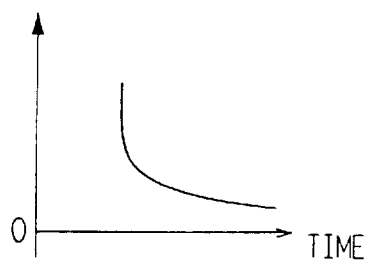
Figure 1C:
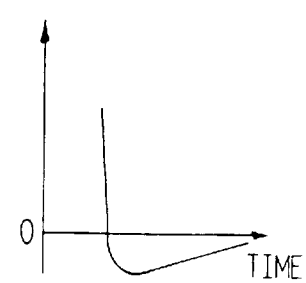
Figure 2A:
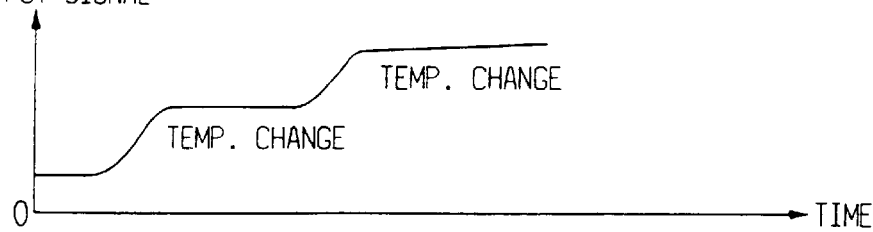
FIGS. 2a, 2b, 2c and 2d illustrate the displacement of the output signal as a function of time for a change of temperature of the medium the pressure of which is to be measured, for a better isolated sensor and for a predetermined pressure in the medium.
Figure 2B:
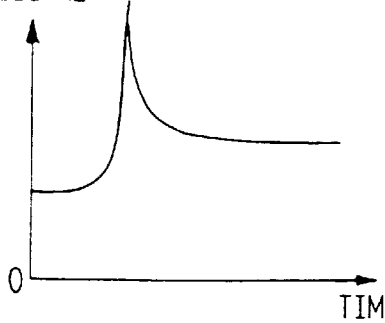
Figure 2C:
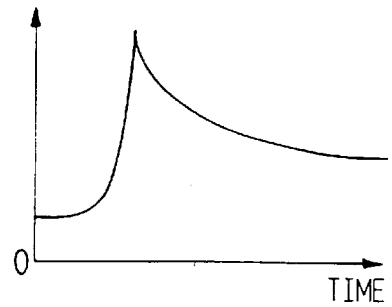
Figure 2D:
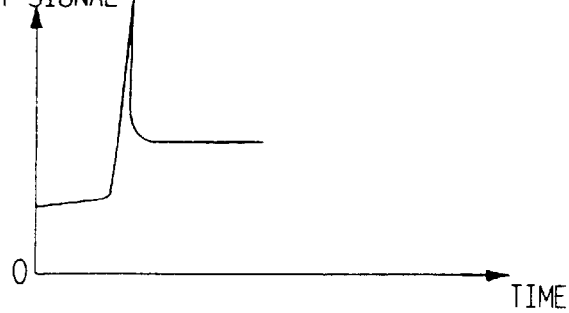

Glass ceramic material has typically a rather linear thermal expansion for temperatures between ambient temperature and about 500° C. At about 475–500° C. the thermal expansion coefficient increases to a larger value. Such a material is to be joined to a metal by means of a glass joint. The joint region will thereby be constructed of the three materials glass ceramics, glass joint and metal. In producing the joint a complete assembly of glass ceramics/glass/metal is heated until the joint glass melts. During the cooling process then the glass in the joint will solidify. In a further cooling the glass will achieve its "strain point" which is the highest temperature from which the glass can be cooled without building permanent mechanical stresses into the glass. In order to achieve a condition which is as free from stresses as is possible, in the joint region, thus, at temperatures lower than this temperature the thermal expansion and contraction characteristics of the included materials must be as similar as possible.

To achieve a glass joint, in the particular case a joint between the glass ceramic material and the metal, a paste or compound is used containing a binding agent, preferably an organic binding agent together with a solvent therefor and glass particles. The binding agent keeps the glass particle together so that the paste can be deposited in a selected thickness and in a suitable pattern on one of the surfaces which is to be joined, usually a surface on the glass ceramics material. Suitable deposition methods can be screen printing and pad/brush printing. The glass material in the particles must be chosen so that it has thermal linear expansion characteristics adapted to that of the glass ceramics according to the above and it should be such that it melts and can flow completely and adhere within a temperature range of about 450 to 530° C., the so called "sealing region", since the curve of the thermal linear expansion of the glass ceramics changes its slope at about 475° C. and the highest temperatures used should not be too much above this temperature. After deposition of the glass paste normally the following steps are performed:

Drying at 100–150° C.

A "burn-off" period at 325–375° C.

A "prefusion"/sintering at 490–500° C.

In the drying process the deposited layer becomes hard so that it can resist handling. The "burn-off" stage is very important. During this step organic solvents and binding agents are removed. If it is not made in an adequate way the joint will not be impermeable and not sufficiently mechanically strong. Then, when the joint material is sufficiently degassed, the temperature is elevated to a temperature within the "sealing region", for instance at a temperature a little lower than the upper limit of this range, for execution of the step "prefusion"/sintering. Then the glass particles are melted together or fusioned, at least partly at their surfaces, without flowing completely. After that the joint material is allowed to cool. The joint material has now become quite hard and has rather well been rid of gases and materials developing gases at temperatures within the "sealing region" but however, some rests still remain.

A joint layer can be given a well-defined thickness after execution of the steps above, if suitable deposition methods are used, so that the layer will after the step of "prefusion"/sintering for example have a thickness of 25 μm. The joint layer can after this step be mechanically worked, e.g. polished, so that it becomes still thinner, which can be advantageous in many cases. It can be suitable to provide such a polishing so that the sintered layer will have a thickness of about 5 μm and thereby the finished joint will have a thickness less than this value.

At last the surfaces which are to be joined to each other, are placed against each other with the joint layer located therebetween. All of the joint region is heated to a temperature within the higher portion of the "sealing region", for instance comprising a peak temperature of about 530° C., where the glass material will be completely liquid and fills the joint. Then also, always a compression force is applied over the joint region.

Figure 3A:
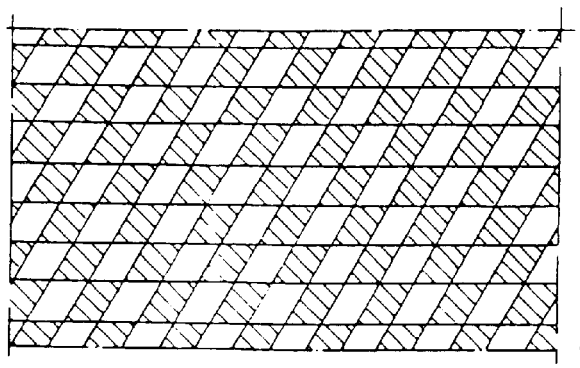
FIG. 3 is a section of a pressure sensor for overpressures or for pressures which do not deviate too much from the atmospherical pressure.
Figure 3B:
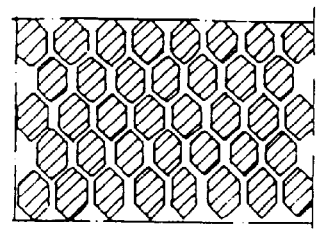

In order to facilitate, in the final degassing during the very joining process, when the metal material is applied against the glass ceramics material having the joint layer located therebetween and when a temperature within the uppermost portion of the "sealing region" is used, the joint material is deposited advantageously as a dotted or channelled pattern, in which interspaces and/or channels are provided between regions of glass paste. Typical patterns are shown in FIGS. 3a and 3b, where the former figure shows a pattern in the shape of oblique squares, the joint material being located within areas having a rhombic or parallel-epipedic shape with the points located adjacent to each other, so that regions having the corresponding shape are provided therebetween. In the latter form the deposited glass paste areas have the shape of hexagons having channels located therebetween. The size of the isles and the dimensions of the interspaces or channels located therebetween are chosen so that the desired degassing effect can be achieved. The isles can typically have a largest measure or diameter of 0.1–0.5 mm comprising interspaces or channels having widths of the same magnitude of order.

A further advantage found in the deposition of joint materials in a non-contiguous layer but as separate small areas, evenly distributed over the joint area can be that the finally finished joint, after the final melting or fusioning will be thinner than the earlier deposited layer itself of glass paste or even thinner than a layer, which possibly is worked to a small thickness, after the sintering step. The distribution of the isles in the deposited glass paste layer must then be selected also considering the desired final thickness of the glass joint.

Figure 4A:
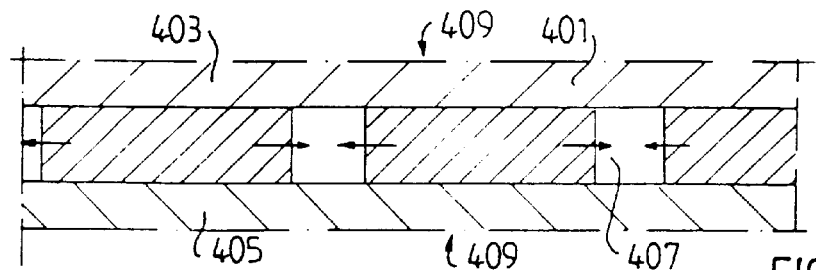
FIGS. 4 and 5 illustrate the attachment of a sensor element for measurement of overpressures and for measurement of low pressures, respectively.
Figure 4B:
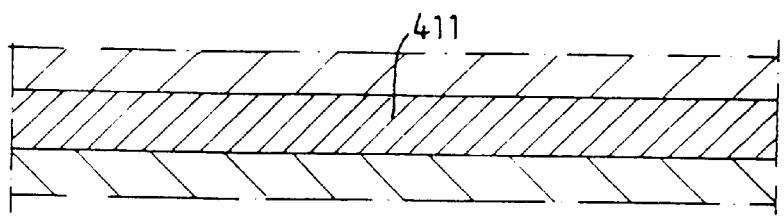

In the final joining in a heating to a temperature within the higher part of the "sealing region", according to what has been said above a compression force is applied over the joint region, e.g. by loading the ceramic material or the metal material with the weight of suitable weights. Remaining gas rests can then exit due to the dotted patterning, as illustrated by FIGS. 4a and 4b. In FIG. 4a a section is illustrated of a joint area having joint material 401 deposited in separate, adjacent isles having a thickness of 5 μm after the sintering step. The joint material is located between the two parts 403 and 405 which are to be joined. The joint area is heated to a suitable temperature and then gas residuals can exit, see the arrows 407. At the same time the parts 403 and 405 are pressed towards each other for achieving a compression of the joint layer, which is illustrated by the arrows 409. Owing to the degassing process, the compression force and the high temperature the glass material in the isles 401 can flow completely in order to form a completely filled and impermeable joint 411, as is illustrated in the corresponding section of FIG. 4b. Then naturally, the thickness of the joint decreases considerably.

The discussion above means, that in joining to a metal metal material having a coefficient of thermal linear expansion adapted to that of the glass and the glass ceramics, must be used, having the best possible agreement within the temperature range mentioned from somewhat below 500° C. to ambient temperature. Suitable metal materials should further have a good chemical resistance and they must also have further characteristics, such as that it must be possible to weld the materials, they must be able to be worked mechanically, etc. Among the stainless steels iron-nickel alloys can be found which at least approximately have the desired properties of thermal linear expansion and which also satisfy the other requirements reasonably.

Figure 5:
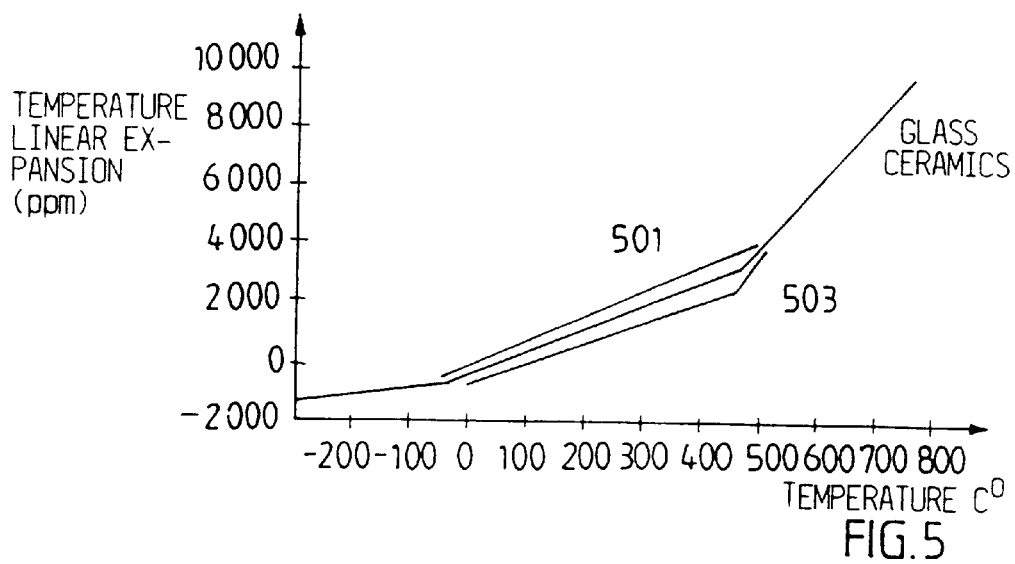

In FIG. 5 thus a diagram is illustrated of the thermal linear expansion as a function of temperature for a typical glass ceramic material. The curve has a linear region between a temperature below 0° C. and somewhat below 500° C. and it is within this region where the coefficient of thermal linear expansion of the two materials must be adapted to each other. At 501 and 503 further, corresponding curves are illustrated for two conceivable NiFe-alloys, the former having a somewhat higher thermal linear expansion and the latter having a somewhat lower thermal linear expansion than the glass ceramics. Otherwise, the curves are well parallel within the considered temperature region. It is also possible to produce alloys having a still better adaption than what appears from the diagram but it can be suitable, depending on the design case, to use metal materials having somewhat deviating thermal linear expansions, so that for example the ceramic material, in the heating process, is always rather exposed to compression forces than tension forces over a joint region.

Figure 6:
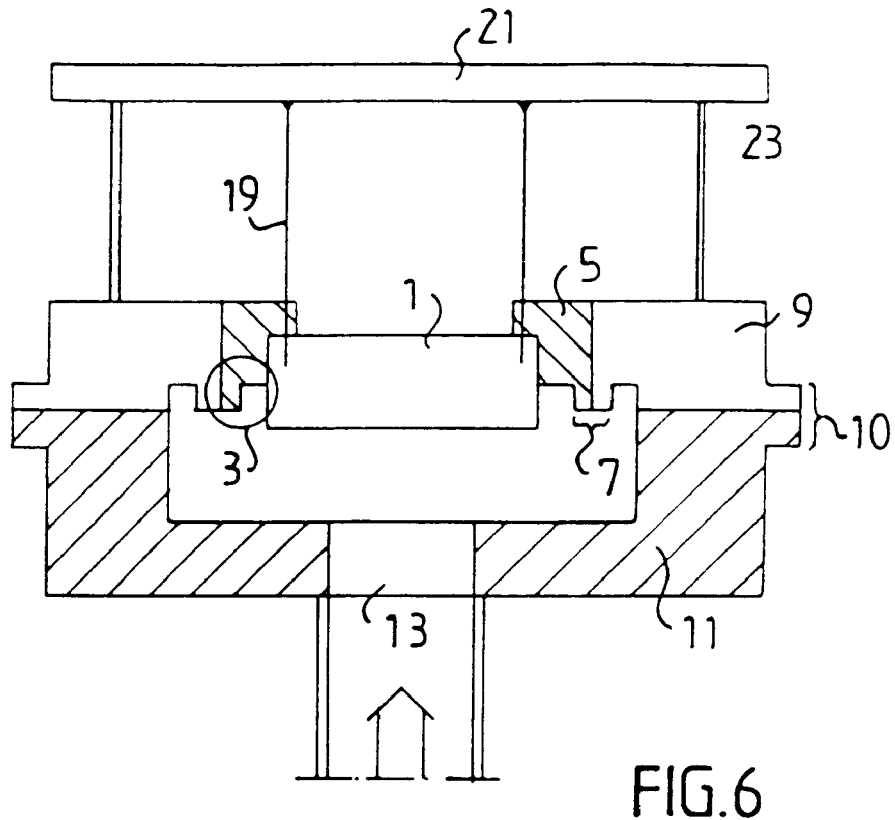
FIG. 6 is a section of a sensor intended for measurement of pressures, where particular requirements are set.

In FIG. 6 a section is illustrated of a capacitive pressure sensor intended for overpressures or moderate underpressures. A sensor element 1 comprising capacitor plates, not shown, such as an electrically conducting plate on an interior surface of a diaphragm, not shown, and an opposite conducting plate on an interior surface of a thicker house part, not shown, has the shape of an essentially circular cylindrical plate-shaped unit 1 made of different parts, not shown, which are based on glass ceramic materials, and is joined by means of glass joints 3 against a support ring 5. The support ring 5 of stainless steel having adapted characteristics according to what has been said above and having a particular composition is welded by means of an annular weld 7 to a mounting ring 9, which surrounds radially the support ring 5. The mounting ring 9 is connected by means of another annular weld 10 to a sensor housing 11, e.g. as is illustrated in the figure at an exterior edge of the mounting ring 9. The sensor housing 11 has a main part shaped as a plate having both an annular bead or platform projecting axially for connection to the mounting ring 9 and a centrally located aperture 13, through which the medium enters the pressure of which is to be measured. At the aperture 13 a suitable thread may be arranged or a nipple or sleeve provided with interior or exterior thread may be attached, not shown in the figure, for attachment of the whole pressure sensor to a fluid line, not shown, for the medium the pressure of which the pressure sensor is intended to measure.

Figure 7:
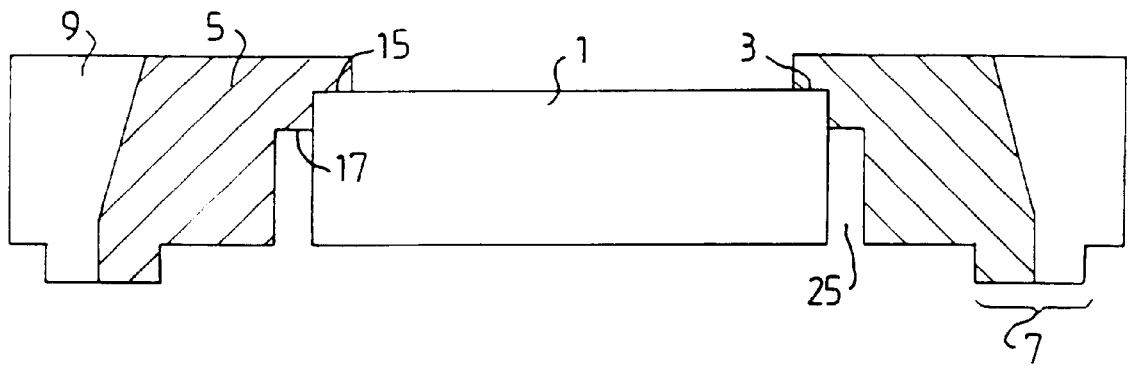
FIGS. 7a, 7b and 7c are sections of the attachment of a sensor element comprising a uniform attachment of a diaphragm in the sensor element.

In FIG. 7 essential details of the pressure sensor in FIG. 6 are shown, i.e. the sensor element 1 and the interior and exterior rings 5 and 9, also in this case shown sectionally, in a somewhat modified embodiment. The support ring 5 thus has an interior shoulder at its one side, so that an annular, inwardly projecting protrusion 15 is formed at one side of the support ring 5. Against this protrusion 15 rests, through a joint, a side surface of the ceramic sensor element 1. The sensor element 1 is also joined to the support ring 5 at a portion of its exterior, essentially cylindrical envelope surface along an essentially cylindrical, annular surface, which connects to the engagement surface against the shoulder formed by the protrusion 15. Actually, the exterior, essentially cylindrical surface of the sensor element is very weakly conical, having a cone angle of for example about 85–88° in order that, in the joining process of the support ring to the sensor element, it will be possible to apply a compression force over the exterior joint region. The essentially cylindrical or weakly conical joint surface however, does not extend over all of the envelope surface of the sensor element 1 but only over a part thereof. The total width of the joint 3, which is formed of glass material at the joint surfaces between the sensor element and the support ring 5, is however always of the same magnitude of order as the thickness of the sensor element in order to obtain a good heat transfer and a secure attachment. By arranging such a wide joint also a satisfactory mechanical strength is accomplished and further a completely impermeable joint, so that the medium cannot reach the rear side of the sensor element 1.

In order to produce the short exterior annular joint surface between the sensor element 1 and the support ring 5 still another shoulder or step, shown at 15, is provided in the interior surface of the support ring 5.

The mounting ring 9 can be made of a conventional stainless steel and the welding joint 7 between the mounting ring 9 and the support ring 5 is in this case arranged on the side where the pressure force acts for overpressures, i.e. at the same side where the diaphragm, not illustrated in this figure, is located in the sensor element 1. Further, the engagement surface between the support ring 5 and the mounting ring 9 is made frusto-conical or tapering away from the side of the sensor element 1, where the pressure of the measurement medium acts, also for adopting or accommodating pressure forces in the use of the pressure sensor for overpressures.

Electrically conducting wires 19, see FIG. 6, pass through holes or recesses, not shown, in the protrusion 15 which projects radially inwards, for connection of electrical conductors, not shown, inside the sensor element 1 to electronic circuits on a circuit board 21, that through some suitable support device such as a cylindrical ring 23 of a suitable material is attached to the mounting ring 9.

The embodiment shown schematically in FIG. 6 of the mounting of the sensor element 1 differs somewhat from that illustrated in FIG. 7. The thickness of the support ring 5 as seen in the axial direction can in the embodiment according to FIG. 6 be essentially equal to the thickness of the sensor element 1, but in the embodiment according to FIG. 7 the thickness of the support ring 5 is larger than that of the sensor element, more particularly in the latter case so that the thickness of the support ring 5 corresponds to the sum of the thickness of the sensor element 1 and the axial width of the protrusion 15. In this case thus, the width of the interior envelope surface of the support ring 5, where the shoulder 17 is located, is essentially equal to the thickness of the sensor element. In the embodiment according to FIG. 6 the protrusion against which the sensor element 1 rests is designed to have a considerably larger thickness, as seen in an axial direction, and in the corresponding way the width as seen in the axial direction of the interior envelope surface of the support ring 5, which faces the exterior circumferential edge of the sensor element 1, is smaller and corresponds to the axial length between the shoulder 17 and the engagement surface of the supporting protrusion 15 in the embodiment illustrated in FIG. 7.

Figure 8:
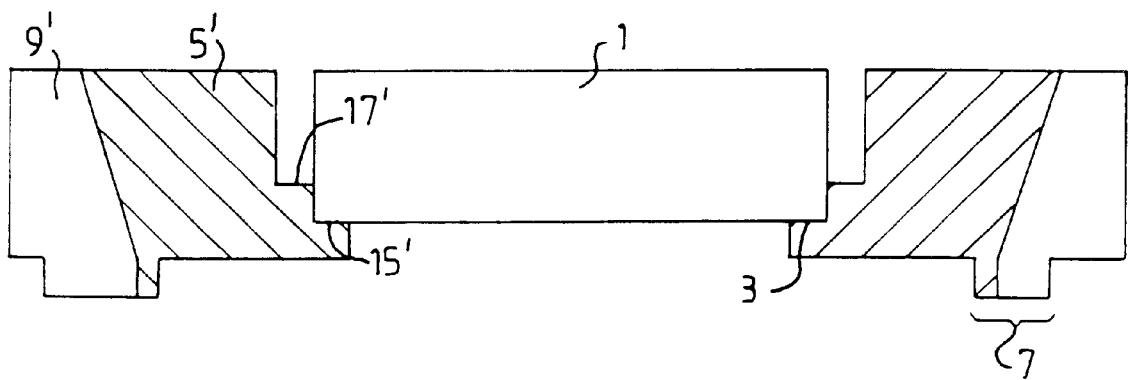

In FIG. 8 are shown, as seen sectionally, the same parts as in FIG. 7 designed for measurement of low pressures, i.e. for a vacuum sensor. The embodiment of FIG. 8 differs from that of FIG. 7 by the fact that the various force receiving surfaces are located for accommodating forces directed from the opposite direction, for FIG. 7 forces originating from a point at the lower portion of the paper, as this figure is drawn, and for FIG. 8 for forces acting from above, from the top portion of the drawing sheet. The inwardly projecting, annular protrusion 15' on the support ring 5' is thus, in the embodiment according to FIG. 5, located on the side of the pressure sensor where the medium is intended to be located, the pressure of which is to be measured. Also the glass joint 3 between the sensor element 1 and the mounting ring 5 is located on this side. The shoulder 17' on the interior cylindrical surface in the mounting ring 9 will here be directed oppositely compared to the shoulder 17 according to FIG. 7. The conical surface of separation between the interior support ring 5' and the exterior mounting ring 9' has here the opposite conicity, i.e. the surface of separation will be more narrow in the direction towards the side of the sensor element where the medium is intended to be present the pressure of which is to be detected.

Figure 9:
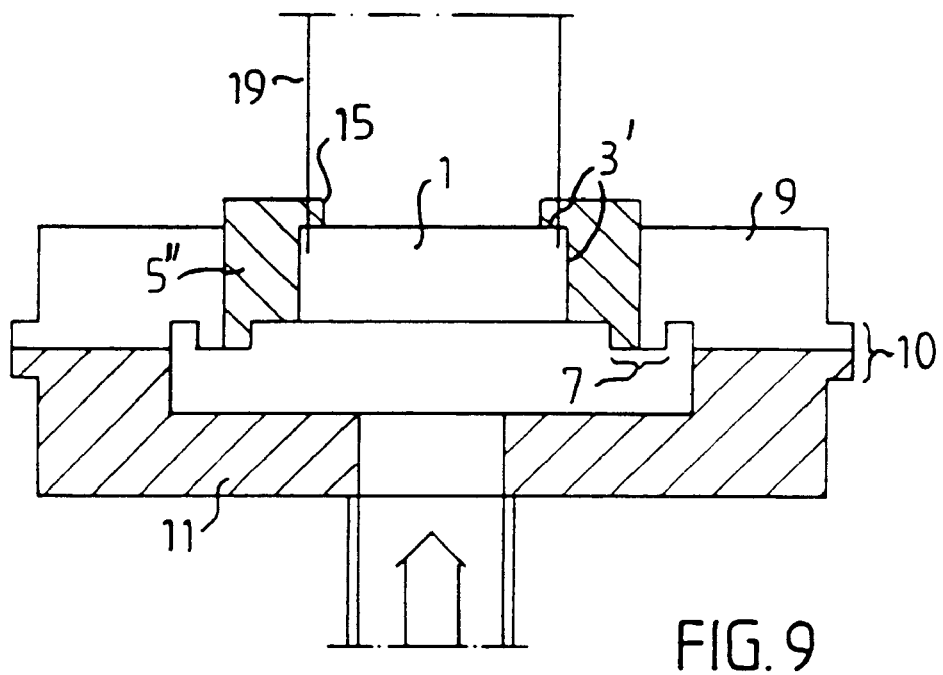

For some applications where special requirements exist, such as within the foodstuff manufacturing industry, for the kind of sensor according to FIG. 7 the slot or recess 25 cannot be accepted, which is formed by the arrangement of the shoulder 17 for reduction of the axial length of the glass joint 3. In such cases, for measurement of overpressures or pressures about the atmospherical pressure, the glass joint 3' between the sensor element 1 and the support ring located directly outside it must be made over the whole width of the sensor element 1 in order to obtain a sufficient strength. An example thereof is shown in FIG. 9 where a section of such a sensor is schematically depicted. The support ring 5" is here thicker in the axial direction, perpendicularly to the large surfaces of the sensor element 1, than in the embodiment according to FIG. 6, and like the embodiments illustrated in FIGS. 7 and 8 having a somewhat larger thickness, as seen in an axial direction, than the sensor element 1. The glass joint 3' is here made in the particular manner, as has been described above, by depositing the material which is to form the glass joint, in a dotted manner or having channels, so that empty regions are formed between regions comprising material. The areas, where no material has been deposited, must be able to form channels up to a free edge of the joint 3'. The dotted or patterned deposition, however, must not necessarily be made over all of the joint area but mainly in the inner portion thereof. In this way formations of larger air or gas enclosures are avoided, i.e. formation of bubbles, etc. When heating this material containing finely divided glass material in a suitable cohesive or binding material, the glass material flows, at a suitable heating, all over of the joint region. Then most of the cohesive material also passes away or exits through the channels which are formed between the ridges in the pattern.

Figure 10A:
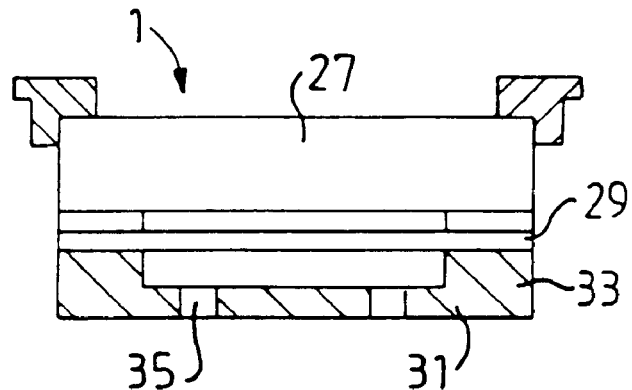
Figure 10B:
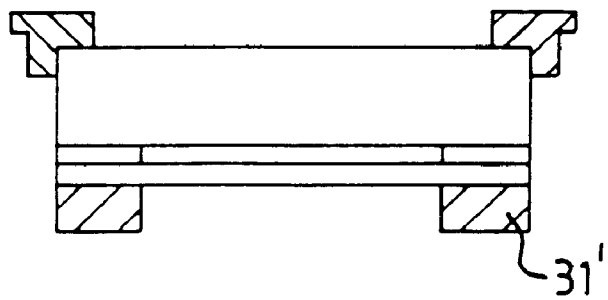
Figure 10C:
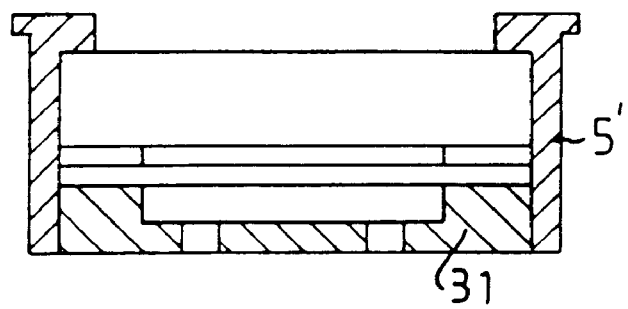

In the case comprising thin diaphragms which are used for measurement of very low pressures a further reinforcement can be arranged for the diaphragm by arranging fact that the reinforcing element is attached to the marginal region of the thin diaphragm. This is schematically shown in the sections of FIGS. 10a, 10b and 10c. It is seen here that the sensor element 1 in the conventional way comprises a thick plate or house part 27 and a thin diaphragm 29 arranged at a small distance from the house part 27. At the opposite side of the diaphragm 29, which is turned away from the housing part 27 and which is intended to face the medium the pressure of which is to be measured thus a reinforcement element is attached having the shape of a plate 31 that comprises an annular projection and through-holes in the interior region of the plate according to FIG. 10a. The counterplate 31 can be of a suitable material, e.g. of glass ceramic materials like the other parts of the sensor element 1 itself. The reinforcement element can also be constituted by an annular element 31' according to FIG. 10b. For the type of sensors according to FIG. 9 having no axial slot at the circumference of the sensor element 1 a counterplate of the type according tc FIG. 10a can be used, as is illustrated in FIG. 10c. The sensor element 1' will hereby be constituted by a thicker assembly which results in that also the height in the axial direction of the surrounding support ring 5' in this case must be increased correspondingly so that the interior surface of the support ring 5' encloses completely the cylindrical envelope surface of the assembled sensor element 1' including the counterplate 31.

The manufacture of a pressure sensor according to FIG. 9 will now be summarized. The housing 11 and the exterior mounting ring 9 are supposed to be already provided and be of suitable stainless steels. The sensor element 1 is first assembled more or less finally of parts made of suitable ceramic materials having electrically conducting layers thereon or therebetween. Its exterior edge surface is given a weakly frusto-conical shape according to what has been described above. The support ring 5" is also made of metal having an interior surface adapted to the edge surface of the sensor element and then also having a correspondingly weakly frusto-conical shape. A layer of joint material is deposited on the edge surface of the sensor element 1, over the whole engagement surface of the support ring to the sensor element, when it is placed around the element. Advantageously, the joint material is dotted or patterned according to what has been described above. The sensor element is placed inside the support ring surrounded thereby and the support ring is connected to the sensor element by heating and then applying suitable forces on the support ring 5" and the sensor element 1, so that the joint material is exposed to a compression force and the material in the joint layer flows and forms a full or contiguous joint. The support ring 5' is attached to the mounting ring 9 by means of welding.

In the production of the support ring it is in particular observed that the support ring is produced of a metal material having an adapted coefficient of thermal linear expansion, i.e. that it has a coefficient of thermal linear expansion which is essentially equal to the coefficient of thermal linear expansion of the ceramic material of which the sensor element is produced. Further, the support ring is produced as a whole ring having no slots, apertures or windows or similar devices.

What is claimed is:

1. A pressure sensor for measuring the pressure of a fluid, comprising:

a housing, positionable in contact with a volume containing the fluid, a sensor element comprising components made of a ceramic material, the sensor element being plate-shaped having a thickness and further having two large surfaces and an edge surface, the edge surface having a width and extending around a circumference of the sensor element, the sensor element further enclosing an interior volume which changes when a pressure acting on at least part of the sensor element changes, and the sensor element further comprising electrical conductor paths having electrical characteristics which change when the interior volume changes, and a support ring made of metal, surrounding the sensor element and rigidly connecting the sensor element to the housing, the sensor element being mechanically attached to the housing only by the support ring, wherein the support ring is directly connected to the sensor element by a ceramic joint at at least a portion of the edge surface of the sensor element, and wherein the metal of the support ring has a coefficient of thermal linear expansion substantially equal to the coefficient of thermal linear expansion of the ceramic material in the sensor element.

2. The pressure sensor of claim 1, wherein the joint has a width substantially equal to the width of the edge surface.

3. The pressure sensor of claim 1, wherein the support ring has a thickness taken in a direction perpendicular to the large surfaces of the sensor element not less than the thickness of the sensor element and wherein a joint between the support ring and the sensor element extends over substantially all of the edge surface of the sensor element.

4. The pressure sensor of claim 1, wherein the support ring is an impermeable ring, so that a fluid cannot pass from one side of the support ring and the sensor element to another, opposite side of the support ring and the sensor element through the support ring.

5. The pressure sensor of claim 1, wherein the support ring is provided with a shoulder in a surface facing a center axis of the support ring, with which shoulder a marginal region of one of the large surfaces of the sensor element is engaged.

6. A pressure sensor for measuring the pressure of a fluid, comprising:

a housing positionable in contact with a volume containing the fluid, a sensor element comprising components made of a ceramic material, the sensor element being plate-shaped having a thickness and further having two large surfaces and an edge surface, the edge surface having a width and extending around a circumference of the sensor element, the sensor element further comprising an interior volume which changes when a pressure acting on at least part of the sensor element changes, and the sensor element further comprising electrical conductor paths having electrical characteristics which change when the interior volume changes, and a support ring made of metal and surrounding the sensor element, the support ring connecting the sensor element to the housing, wherein the sensor element has a cylindrical or frusto-conical shape, so that the edge surface constitutes the envelope surface of a cylinder or a frustum of a cone, respectively, and wherein the support ring is directly attached to the sensor element by means of a ceramic joint at at least a portion of the edge surface of the sensor element.

7. A pressure sensor for measuring the pressure of a fluid, comprising:

a housing positionable in contact with a volume containing the fluid, a sensor element comprising components made of a ceramic material, the sensor element being plate-shaped having a thickness and further having two large surfaces and an edge surface, the edge surface having a width and extending around a circumference of the sensor element, the sensor element further comprising an interior volume which changes when a pressure acting on at least part of the sensor element changes, and the sensor element further comprising electrical conductor paths having electrical characteristics which change when the interior volume changes, and a support ring made of metal and surrounding the sensor element, the support ring connecting the sensor element to the housing and having a ceramic joint to the sensor element, wherein the joint has a width substantially equal to the width of the edge surface of the sensor element.

8. A pressure sensor for measuring the pressure of a fluid, comprising:

a housing, positionable in contact with a volume containing the fluid, a sensor element comprising components made of a ceramic material, the sensor element being plate-shaped having a thickness and further having two large surfaces and an edge surface, the edge surface having a width and extending around a circumference of the sensor element, the sensor element further comprising an interior volume which changes when a pressure acting on at least part of the sensor element changes, and the sensor element further comprising electrical conductor paths having electrical characteristics which change when the interior volume changes, and a support ring made of metal and surrounding the sensor element, the support ring connecting the sensor element to the housing and having a ceramic joint to the sensor element, wherein the thickness of the support ring taken in a direction perpendicular to the large surfaces of the sensor element is not less than the thickness of the sensor element, and wherein the ceramic joint between the support ring and the sensor element extends over substantially all of the edge surface of the sensor element.

9. A pressure sensor for measuring the pressure of a fluid, comprising:

a housing, positionable in contact with a volume containing the fluid, a sensor element comprising components made of a ceramic material, the sensor element being plate-shaped having a thickness and further having two large surfaces and an edge surface, the edge surface having a width and extending around a circumference of the sensor element, the sensor element further comprising an interior volume which changes when a pressure acting on at least part of the sensor element changes, and the sensor element further comprising electrical conductor paths having electrical characteristics which change when the interior volume changes, and a support ring made of metal and surrounding the sensor element, the support ring connecting the sensor element to the housing and having a ceramic joint to the sensor element, wherein the support ring is an impermeable ring, so that a fluid cannot pass from one side of the support ring and the sensor element to another, opposite side of the support ring and the sensor element through the support ring.

10. The pressure sensor of claim 6, wherein the joint has a width substantially equal to the width of the edge surface.

11. The pressure sensor of claim 6, wherein the support ring has a thickness taken in a direction perpendicular to the large surfaces of the sensor element not less than the thickness of the sensor element and wherein the ceramic joint between the support ring and the sensor element extends over substantially all of the edge surface of the sensor element.

12. The pressure sensor of claim 6, wherein the support ring is an impermeable ring, so that a fluid at one side of the support ring and the sensor element cannot pass to another, opposite side of the support ring and the sensor element through the support ring.

13. The pressure sensor of claim 6, wherein the support ring is provided with a shoulder in a surface facing a center axis of the support, with which shoulder a marginal region of one of the large surfaces of the sensor element is engaged.

14. The pressure sensor of claim 7, wherein the support ring is an impermeable ring, so that a fluid at one side of the support ring and the sensor element cannot pass to another, opposite side of the support ring and the sensor element through the support ring.

15. The pressure sensor of claim 7, wherein the support ring is provided with a shoulder in a surface facing a center axis of the support, with which shoulder a marginal region of one of the large surfaces of the sensor element is engaged.

* * * * *